United States Patent [19]

Thatcher

[11] 4,342,193

[45] Aug. 3, 1982

[54] CONVERTIBLE ROCKET-AIR BREATHING ENGINE

[76] Inventor: Albert G. Thatcher, 39 Briarcliff Rd., Mountain Lakes, N.J. 07046

[21] Appl. No.: 571,325

[22] Filed: Aug. 9, 1966

Related U.S. Application Data

[63] Continuation-in-part of Ser. No. 361,149, Apr. 20, 1964, abandoned.

[51] Int. Cl.$^2$ .............................................. F02K 5/00
[52] U.S. Cl. ........................................ 60/246; 60/261
[58] Field of Search .......................... 60/244, 246, 261

[56] References Cited

U.S. PATENT DOCUMENTS

| | | | |
|---|---|---|---|
| 2,883,828 | 4/1959 | Howell | 60/246 |
| 2,883,829 | 4/1959 | Africano | 60/245 |
| 3,036,428 | 5/1962 | Chillson | 60/258 |
| 3,229,459 | 1/1966 | Cervenka | 60/244 |
| 3,308,626 | 3/1967 | Nelson et al. | 60/244 |

Primary Examiner—Verlin R. Pendegrass

[57] ABSTRACT

A rocket engine is described having a hollow rotor positioned in axial alignment with an outer tubular casing. Fuel and oxidizer are mixed and burned in a first combustion chamber in the rotor and then expelled through nozzles into a second combustion chamber. Vanes are secured to the rotor for pumping air into the second combustion chamber through valve flaps during a first mode of operation, an oxidizer nozzle is positioned in alignment with the rotor axis for supplying oxidizer to the second combustion chamber during a second mode of operation.

8 Claims, 5 Drawing Figures

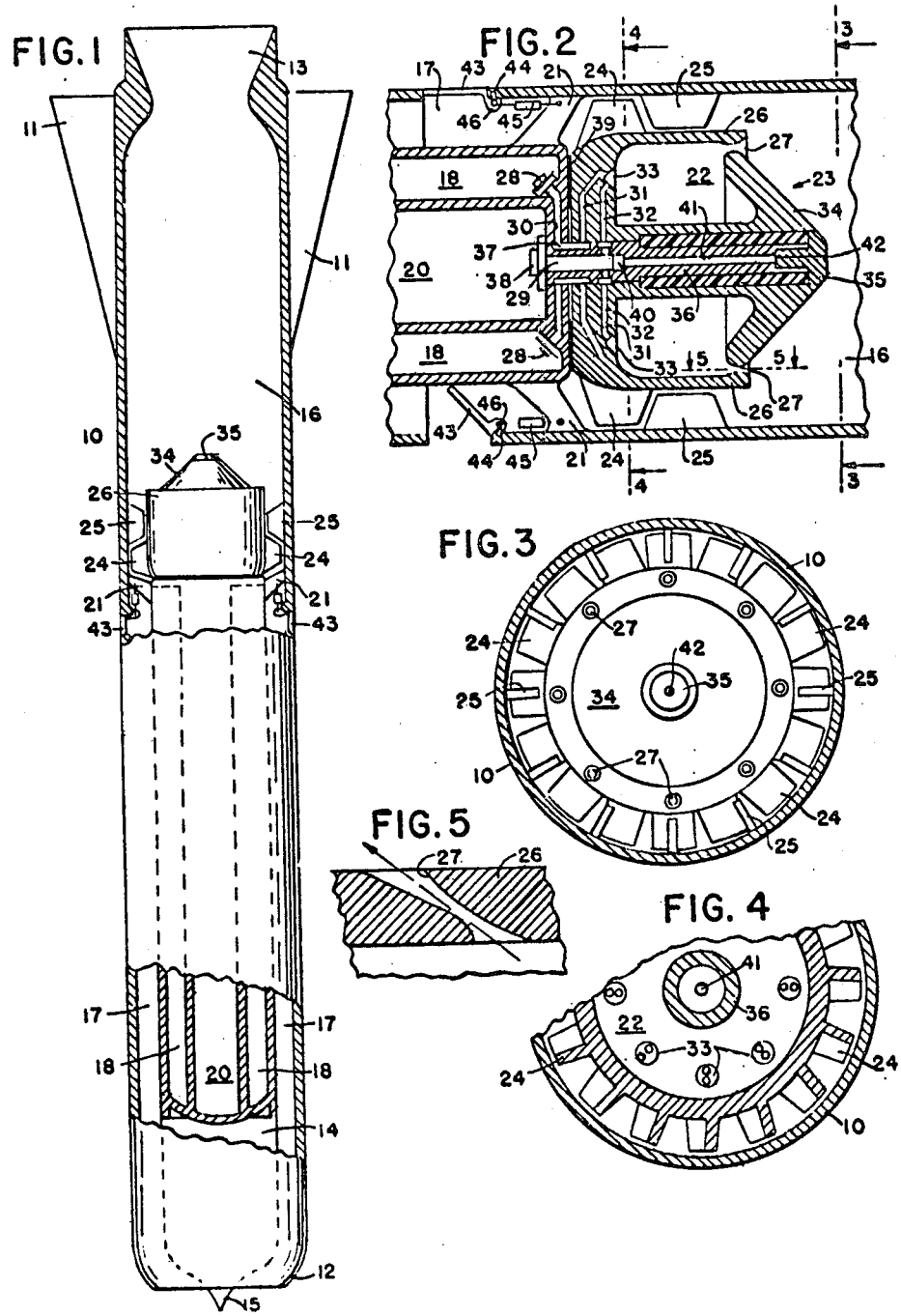

CONVERTIBLE ROCKET-AIR BREATHING ENGINE

This application is a continuation-in-part of my co-pending application, Ser. No. 361,149, filed Apr. 20, 1964, now abandoned.

This invention relates to a rocket-air engine which can fly in the lower altitudes using air as oxidizing agent or fly in the higher altitudes or at an accelerated rate using a stored oxidizer to unite with the fuel. The invention has particular reference to a conversion structure for changing from one system for burning fuel to another system. The invention also has reference to a rocket engine which is variable in thrust so as to provide a wide range of rocket speeds for cruising or homing a target.

Conventional jet or rocket engines are either arranged for flying in the higher altitudes where there is not enough air to provide an oxidizing means or else to fly in the lower atmosphere where air can be used. Also, conventional airborne vehicles are generally designed to fly at a speed which may be its most efficient speed in relationship to the distance covered and the fuel consumed. The present invention is an engine which can be used as an anti-missile missile and for this purpose it can be launched into the lower atmosphere at a comparatively slow speed and high propulsive efficiency whenever there is a danger of an attack by an enemy vehicle. When the attacking vehicle is located, a guidance control signal is sent to the rocket and its engine is converted into a device which uses fuel and a stored oxidizer. This conversion increases the engine's thrust and permits the vehicle to home rapidly on its target whether it be in or out of the atmosphere.

One of the objects of this invention is to provide an improved rocket-air engine which avoids one or more of the disadvantages and limitations of prior art arrangements.

Another object of the invention is to provide an efficient change-over system when a vehicle moves from a lower altitude to a higher altitude or for attaining a higher acceleration and speed.

Another object of the invention is to provide a rocket engine which uses fuel and air during a first mode of operation and uses fuel and a stored oxidizer during a second mode of operation.

Another object of the invention is to reduce the number of parts in a convertible rocket engine.

Another object of the invention is to provide an efficient after burner nozzle which can be used at any speed.

The invention comprises an air rocket engine which includes a hollow rotor mounted for axial rotation, this rotor having a first combustion chamber positioned in the hollow portion of the rotor. A propulsion nozzle is positioned downstream from the hollow space and discharges partially oxidized fuel into a second combustion chamber which is open at its downstream end to the ambient space. The rotor is provided with a plurality of vanes secured to its outer periphery. These movable vanes cooperate with a plurality of stationary vanes secured to the vehicle wall and pump air from the atmosphere into the second combustion chamber. A second oxidizer nozzle is provided in axial alignment with the rotor axis and is arranged for discharging oxidizer fluid into the second combustion chamber. The rotor is provided with radial conduits which supply fuel and oxidizer to the first combustion chamber using centrifugal force for pumping both fluids. An air bypass valve is provided for obstructing the air conduit and eliminating air from the rotating vanes when the vehicle reaches the higher altitudes and is switched to the second mode of operation using the stored oxidizer.

For a better understanding of the present invention, together with other and further objects thereof, reference is made to the following description taken in connection with the accompanying drawings.

FIG. 1 is a side view of the rocket, partly in section, showing the rotating chamber, the rotatable and stationary vanes, the after burner combustion chamber, and the storage chambers for the fuel and oxidizer.

FIG. 2 is a cross sectional view, to an enlarged scale, showing the rotating combustion chamber, and other details which include the fluid and oxidizer conduits.

FIG. 3 is a cross sectional view of the rotating chamber shown in FIG. 2 and is taken along line 3—3 of that figure.

FIG. 4 is a partial cross sectional view of the rotating chamber shown in FIG. 2 and is taken along line 4—4 of that figure.

FIG. 5 is a cross sectional view of one of the nozzles shown in FIG. 2 and is taken along line 5—5 of that figure.

Referring now to FIG. 1, a complete vehicle is shown which includes an outer casing 10, guiding fins 11, a nose 12, and an exit nozzle 13 where the burnt gasses are expelled. The payload 14 is positioned near the nose 12 of the vehicle and may be an explosive or any other material which the vehicle is designed to carry. The payload container may be terminated by a point 15 which may cause an explosion when the vehicle strikes another object in the air.

In this rocket there are two combustion chambers, one within the rotating head 23, and a second in the space 16 downstream from the rotating element. This second space 16 is for the after burner combustion where the partially burned fuel may be completely oxidized. When the vehicle is in the lower atmosphere, air is forced through an annular space 17 adjoining the outer shell 10. This air is eventually pumped into space 16 for completeing the burning operation. A second annular space 18 is provided adjoining space 17 for either the fuel or the oxidizing chemical. A central storage space 20 is also provided for housing either the fuel or the oxidizing chemical, these storage spaces being separated from each other by metal walls which completely enclose them except for outlets near the revolving head.

In order to pump air into the after burner space 16, a plurality of equally spaced movable vanes 24 is secured to the rotating head 23. These vanes are turned by the head and provide a pumping action to force air from space 17 into the second combustion chamber 16. A series of stationary struts 21 may be provided for holding the storage compartments 18 and 20 in place but any other means of securing these compartments may be used. Adjacent to the movable vanes 24 is a plurality of stationary vanes 25 which cooperate with vanes 24 to provide a positive pumping action.

Referring now to FIGS. 2, 3, 4, and 5, the details of the rotating combustion chamber are shown. The rotatable head 23 is supported on a thrust bearing 39 which transmits the force of the rocket jet to the two storage chambers. The rotating chamber comprises an outer casing 26 which is terminated by a plurality of nozzles 27 downstream from the thrust bearing. The casing 26 encloses an annular space 22 where the first combustion process takes place. Adjoining the thrust bearing is an axial journal which permits the head 23 to turn on an axis which is in line with the axis of the vehicle. The base portion of the rotating head 23 includes a plurality of radial conduits 31 and 32 which move the fuel and the oxidizer fluids from the two compartments 18 and 20 to nozzles 33 in the first combustion chamber.

The revolving head 23 is formed with a downstream cone 34, this cone being terminated by a head piece 35 which is secured to a shaft 36. The shaft 36 forms a bearing and permits the head to revolve. When the device is in operation, fluid from container 18 is admitted through an explosively opened valve 28 into a radial conduit 30, then through an axial chamber 37, through radial conduit 31, and to the mixing orifice 33. Fluid from container 20 is admitted through valve 38 into an axial conduit 29 and then through radial conduit 32 to mixing chamber 33. It is planned to store fuel in container 18 and oxidizer in container 20 since conduit 29 can be extended through shaft 36 to head 35 where it may be released to furnish oxidizer to the after burner portion of the rocket and complete the oxidization of the fuel before being discharged through the main throat 13.

There are many ways in which the fuel and oxidizer fluids may be transported to the first combustion chamber 22. The conduit means shown in FIG. 2 is preferred because conduits 31 and 32 are radial and the rotation of the revolving head 23 furnishes centrifugal force to pump the fluids into the mixing chamber 33. This simple arrangement does not require any additional pumping means or pressurized storage containers. The fluid in container 20 is admitted into conduit 29 by valve 38 which may be explosively operated. Another valve 40 is placed at the end of conduit 30 and communicates with an axial conduit 41 and a nozzle 42. Valve 40 is opened after valve 38 and permits the oxidizer chemical to flow through conduit 41 and out through nozzle 42 to mix with the partially burned fuel in the after burner combustion chamber 16 to add additional thrust to the vehicle.

Referring now to FIG. 5, nozzles 27 are mounted at an angle to the axis of the vehicle and, because of this, the rotating head 23 is given a considerable rotating speed, enough to provide vanes 24 with the required velocity to give a positive pumping action to the air which is admitted through the annular space 17. Referring now to FIG. 3, vanes 24 are equally spaced around the periphery of the revolving head. Vanes 25 are also equally spaced and are set in axial alignment with the vehicle.

When the rocket gets above the earth's atmosphere, or when there is not enough air available for proper combustion in the after burner chamber, a series of flaps 43 are rocked on pivots 44 to close the annular chamber 17 and to shut off air from the after burner chamber. The closed position of flaps 43 is shown in the upper portion of FIG. 2 while the operated position of these flaps 43 is shown in the lower portion of the drawing. The flaps may be opened by any convenient power means but it has been found convenient to operate these valves by electromagnetic means, a small solenoid 45 being provided for this purpose. The solenoid 45 is connected between a portion of strut 21 and an extension 46 of the flap 43. It is necessary to shut off the annular chamber 17 from vanes 24 and 25 because when there is not sufficient air to provide efficient combustion in the after chamber, there may be enough air to hamper the efficient operation of the second combustion chamber.

The operation of this device has been described above in connection with the description of the various components. When the rocket is first fired from the ground or from an airplane, valves 28 and 38 are opened and flaps 43 are in their closed position admitting air to the after burner space 16. When the rocket reaches the rarified atmosphere or when the second mode of operation is necessary, valve 40 is opened, thereby admitting oxidizer fluid to the after burning through nozzle 42. At this time flaps 43 are opened, shutting off air from the after burner space 16. In this condition the rocket increases its speed and may be directed to a moving target.

From the above description it is evident that a rocket-air engine has been described having two modes of operation. The control system which is operated by a guidance signal, by radio waves, or by a laser beam has not been described because such a system is not a part of this invention.

While there have been described and illustrated specific embodiments of the invention, it will be evident that various changes, modifications, and additions can be made therein without departing from the field of the invention which should be limited only by the scope of the appended claims.

I claim:

1. A convertible rocket-air breathing engine comprising, a tubular casing for housing all the engine components, said casing having an entrance opening at one end for admitting air and an exit opening at the other end for discharging burned gasses, a hollow rotor positioned in axial alignment with the casing and mounted for rotation, said rotor formed with walls which define a first combustion chamber where a fuel and an oxidizer are mixed and burned, said rotor also formed with a plurality of exit propulsion nozzles at the downstream end of the rotor for ejecting partially burned gasses, a second combustion chamber downstream from the rotor for mixing air with the partially burned gasses during a first mode of operation, a plurality of vanes secured to said rotor for pumping air into the second combustion chamber, a plurality of fuel nozzles positioned within the first combustion chamber for ejecting fluid fuel therein, a plurality of oxidizer nozzles also positioned within the first combustion chamber for ejecting fluid oxidizer therein, a second oxidizer nozzle in alignment with the rotor axis for supplying oxidizer fluid to the second combustion chamber during a second mode of operation, and valve flaps in the tubular casing for permitting air to pass from the atmosphere to the second combustion chamber during the first mode of operation and for blocking the air flow during the second mode of operation.

2. A rocket engine as claimed in claim 1 wherein said propulsion nozzles are disposed at an angle to the axis of rotation for turning the rotor and the rotor vanes.

3. A rocket engine as claimed in claim 1 wherein a plurality of stationary vanes are secured to the inside surface of the tubular casing for cooperating with the vanes secured to the rotor to pump air into the second combustion chamber.

4. A rocket engine as claimed in claim 1 wherein said hollow rotor is journalled on an axial shaft which contains conduits for supplying both oxidizer and fuel to the first combustion chamber.

5. A rocket engine as claimed in claim 1 wherein a plurality of radial conduits are positioned in the rotor and connected to said fuel and oxidizer nozzles for pumping fluids to the nozzles by centrifugal force when the rotor turns.

6. A rocket engine as claimed in claim 1 wherein a plurality of solenoids are coupled between said valve flaps and a portion of the casing for opening the flaps for the second mode of operation.

7. A rocket engine as claimed in claim 1 wherein an axial conduit is provided in an axial shaft on which the rotor turns, said conduit arranged for supplying oxidizer fluid to the second combustion chamber during the second mode of operation.

8. A rocket engine as claimed in claim 7 wherein said axial conduit is terminated by a nozzle in the second combustion chamber which is positioned downstream from said propulsion nozzle.

* * * * *